May 8, 1934. W. C. DREWS 1,958,188
SHOCK ABSORBER
Filed April 2, 1932 3 Sheets-Sheet 1
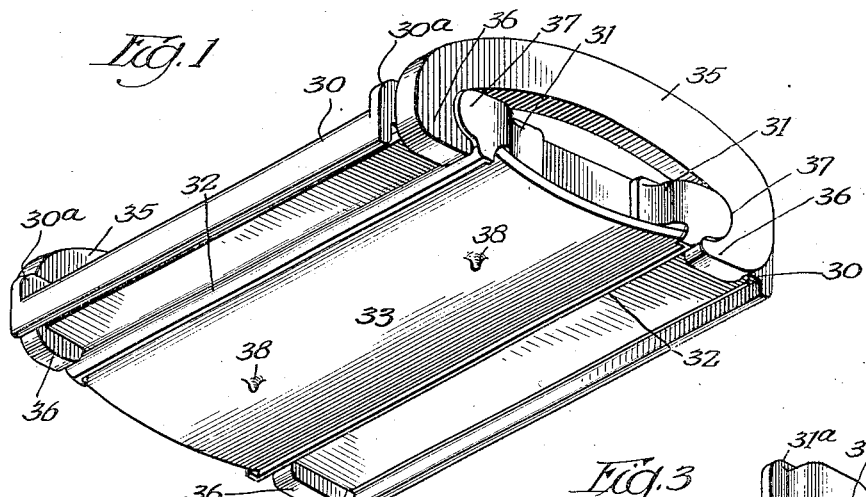
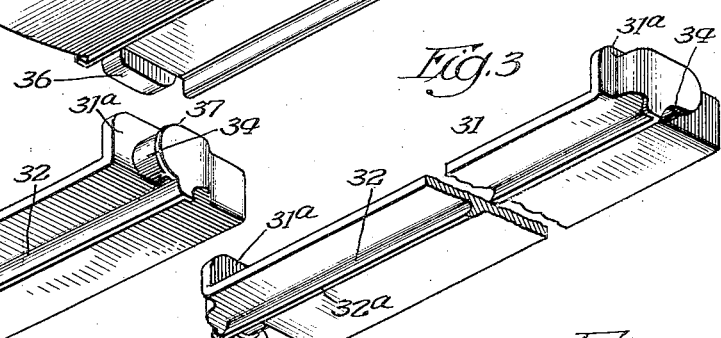
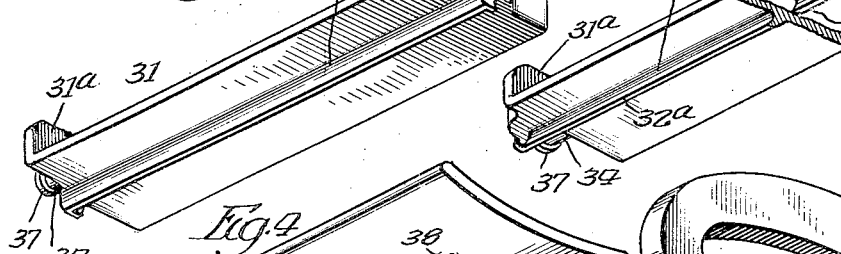
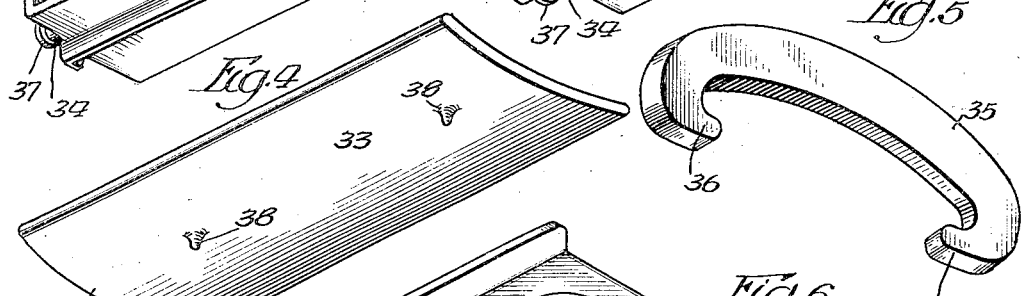
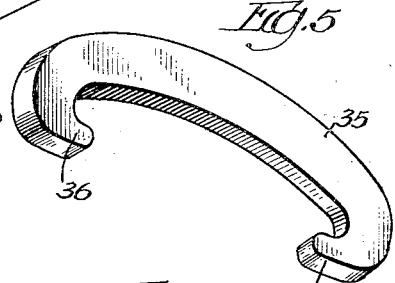
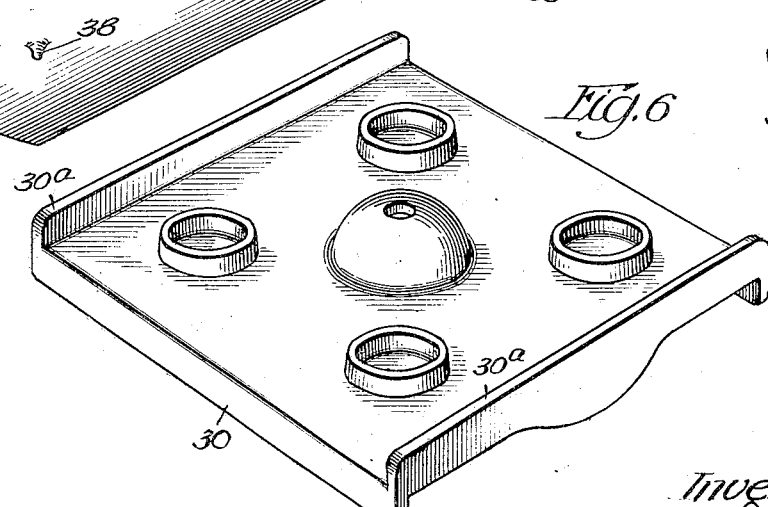
Inventor
William C. Drews
By Fred Gerlach Atty
his

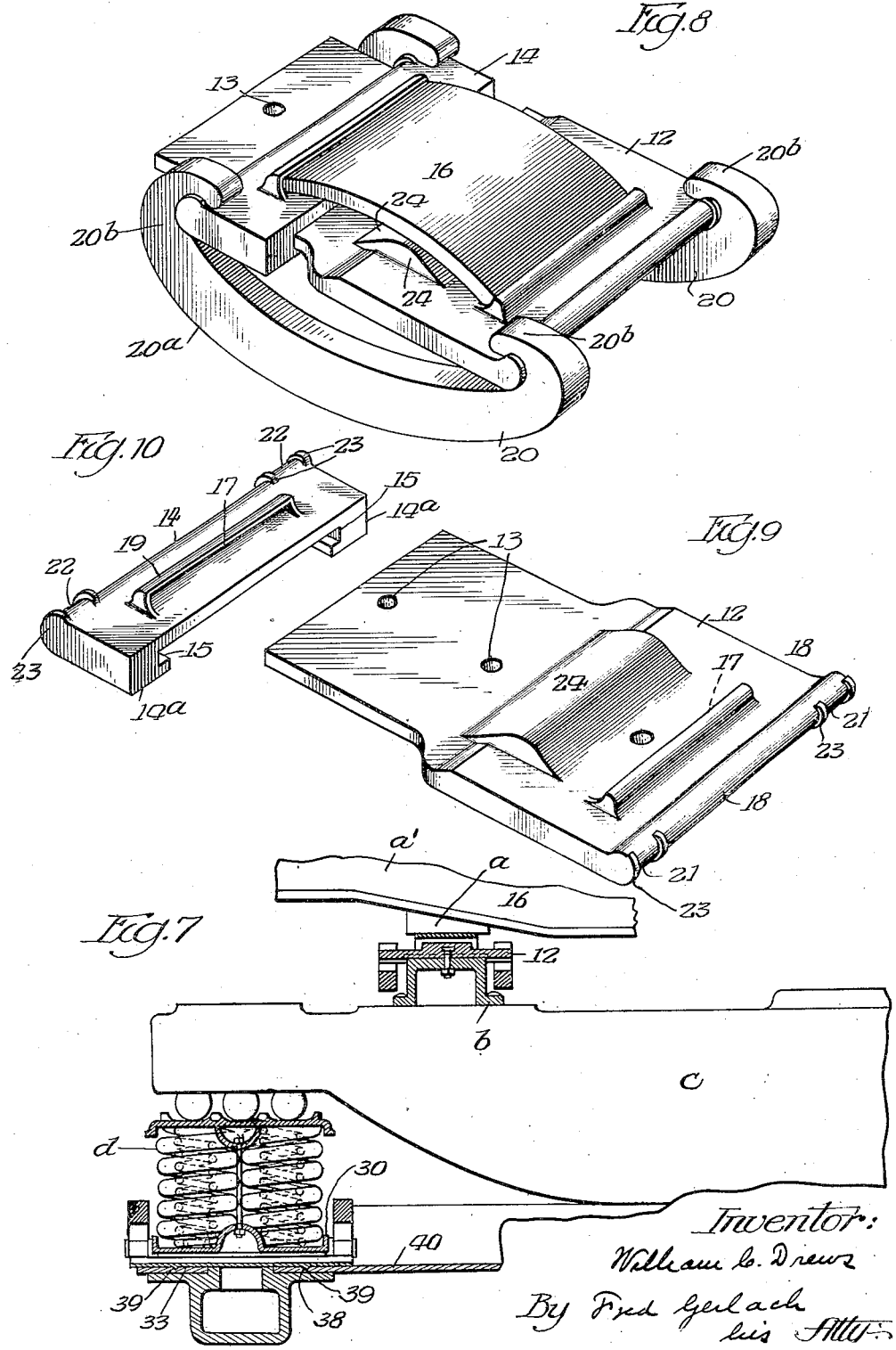

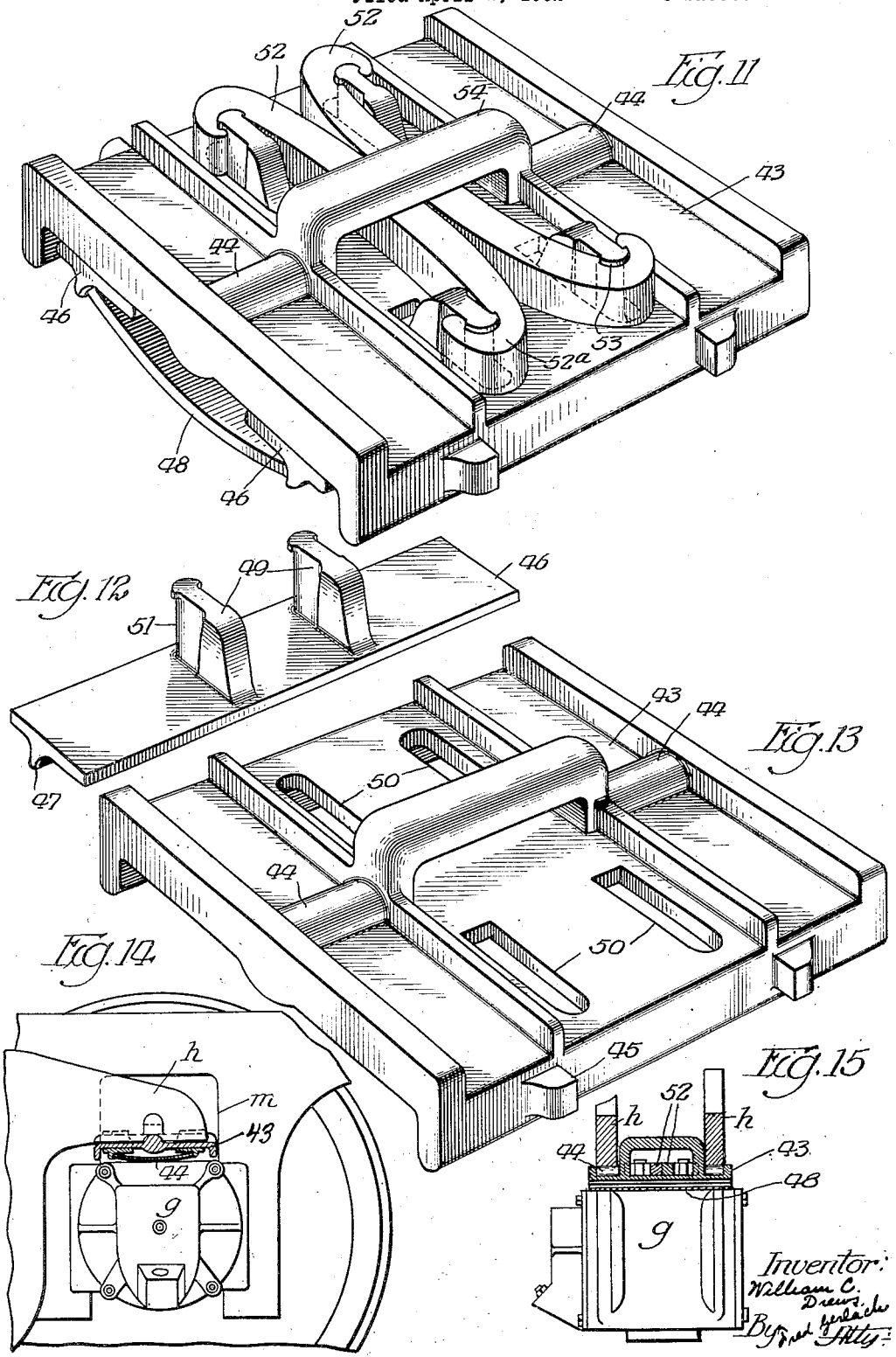

Patented May 8, 1934

1,958,188

UNITED STATES PATENT OFFICE 1,958,188

SHOCK ABSORBER

William C. Drews, Maywood, Ill.

Application April 2, 1932, Serial No. 602,814

20 Claims. (Cl. 267—3)

The invention relates to shock absorbers and more particularly to that type which is adapted for heavy loads, such as railway cars.

One object of the invention is to provide an improved shock absorber unit which is particularly adapted for heavy loads, which is simple in construction and efficient in operation, particularly in breaking up the harmonic spring action of the cushioning springs in railway cars.

Another object of the invention is to provide a construction of shock absorber which readily lends itself for use in railway cars between the journal box and equalizers, between the bolster springs and the side frames of the truck, between the car body and the truck bolster, and in other places.

Other objects of the invention will appear from the detailed description.

The invention consists in the several novel features hereinafter set forth and more particularly defined by claims at the conclusion hereof.

In the drawings: Fig. 1 is a perspective of a shock absorber adapted for use between the bolster springs and the truck frame. Figs. 2 and 3 are perspectives of the slidable abutments. Fig. 4 is a perspective of the resilient bowed plate. Fig. 5 is a perspective of the bed plate, against which the bolster springs rest, the shock absorber being removed. Fig. 6 is a perspective of one of the resilient trusses. Fig. 7 is a transverse section of a car truck, showing the shock absorber applied between the bolster springs and the truck frame and also between the car body and the truck bolster. Fig. 8 is a perspective of a shock absorber adapted to serve as a side bearing between the truck bolster and the body of the car. Fig. 9 is a perspective of the base or bed-plate of the shock absorber. Fig. 10 is a perspective of the slidable abutment member used on the plate shown in Fig. 9. Fig. 11 is a perspective of a shock absorber embodying the invention as applied between the pedestal and the journal box of a railway truck. Fig. 12 is a perspective of one of the abutment plates. Fig. 13 is a perspective of the mounting plate in the form of the invention shown in Fig. 11. Fig. 14 is a longitudinal section through the shock absorber of Fig. 11 applied to the journal box. Fig. 15 is a longitudinal section through the shock absorber of Fig. 11.

In Figs. 1 to 7, the invention is illustrated as applied between a bed or base-plate 30 for a set of helical springs under the truck bolster and the frame of a freight car truck. A pair of abutment members 31 are slidably mounted on and under the base-plate 30. Each member 31 is slidably mounted on and under the base-plate 30 and has an abutment 32 with a recess 32ª to form a seat for one end of a resilient bowed or arched plate 33 which underlies the base-plate 30. The base-plate 30 has side flanges 30ª and abutment members 31 have side flanges 31ª to slidably guide the abutment members on the base-plate. Pivot lugs 34 are provided at the ends of the abutment members outside of the flanges 31ª. Resilient arched or bowed trusses 35 at the sides of the base-plate respectively have hooks 36 which engage the pivot lugs 34 on the slidable members 31 to yieldingly resist the spreading of said members by the bowed plate 33. Lugs 37 on the seats prevent lateral displacement of the trusses from the pivot-lugs. The crest of the bowed plate 33 has a pair of outstruck lugs 38 which interfit with sockets 39 in the cross-bar 40 of the truck to retain the bowed plate against longitudinal or transverse movement over said bar. When the elements, between which the shock absorbers are used, are subjected to shock, the resultant stresses will force the elements together against the force of the resilient plate 33. The load exerted on said plate will bend and flatten the arched plate and as the plate flattens its ends will spread the abutments 31 which are engaged by the ends of the plate. The resilient trusses 35 will resist the spreading of the abutments and the flattening of the resilient plate and adapt the shock absorber for heavy loads. Springs $d$ hold the plate 30 down, so the resilient plate 33 will remain in engagement with the frame of the truck. The bolster is carried by a plate $e$ over springs $d$ as well understood in the art.

In the form of the invention shown in Figs. 8, 9, and 10, the shock absorber unit comprises a base-member 12 which consists of a rigid plate of metal provided with holes 13 so that the plate can be secured by bolts to one of the elements between which the shock absorber is to be used, such as a block $b$ on the truck-bolster $c$. One end portion of the base-plate 12 is reduced in width and an abutment member 14 is slidably mounted on said reduced portion. Depending ends 14ª have grooves 15 in which side margins of the base-plate fit to hold the abutment member 14 in slidably connected relation to the base-plate. An arched or bowed resilient plate 16 overlies the base-member 12, and its ends are confined in recesses 17 formed respectively in a transversely extending abutment 18 projecting with the base-member 12 and a similar oppositely facing abutment 19 which is integrally formed with slidable member 14. The crest of the bowed plate 16 bears against a block a fixed on the body-bolster a' of a car-body. When the car-body or the truck-bolster is subjected to shock, the resultant stresses will impose the load of the body on the resilient plate 16 which will yieldingly resist the relative vertical movement of the car-body and the truck bolster. These stresses will bend and flatten the bowed plate, and as the plate flattens, its ends will spread the abutments 18, 19 which are engaged by the ends of the plate 16. To resist the spreading of the abutments and the flattening of the resilient plate, and to adapt the shock absorber for car-bodies, a pair of arched trusses 20 are applied to oppose or resist the spreading of the abutments on the slidably connected members 12, 14. Each truss comprises a central arched portion 20$^a$ and a hook 20$^b$ at each of its ends. These trusses are disposed at the sides of the slidably connected members and outwardly of the arched plate 16 to clear the elements between which the shock absorber is used. Each metal truss has one of its hooks 20 looped around and engaging a pivot seat 21 on one end of the base-member 12, and its other hook 20$^b$ fittted around and engaging a pivot seat 22 on one end of the slidable abutment member 14. Ribs 23 on said pivot-seats hold the trusses against transverse displacement from the slidably connected members. As the shock stresses are applied against and flatten the resilient plate 16, the spreading of the abutments, caused by flattening of the resilient plate, exerts, through pivot-seats 21, 22, a spreading or expanding pressure against the hooks 20$^b$, and the arched form of the trusses permits them to yield to the load. Normally the plate 16 is under sufficient pressure to retain its ends in engagement with the abutments, and the trusses, besides resisting the flexing of the resilient plate, yieldingly hold the abutments seated against the ends of the plate 16. A fixed lug 24 is formed on base 12 under the crest of the arched plate to limit the flexing of said plate and prevent it from being bent to such an extent as to eliminate its resiliency.

In Figs. 11 to 15, the invention is illustrated as applied between the journal box g for a car axle, which is vertically slidable in the pedestal m, and equalizer bars h. A plate 43 is provided on its upper face with seats 44 for the equalizer-bars h, so that the plate will be pressed downwardly toward the journal box. The plate 43 serves as a mounting for the shock absorber, and is provided with lugs 45 to slidably guide the mounting plate in the pedestal m. A pair of abutment-members 46 are slidably mounted on the underside of the mounting plate 43. Each of said members has an abutment 47 forming a seat for one end of a bowed resilient plate 48, the crest of which bears against the top of the journal box g. A pair of upstanding lugs 49 are formed on each abutment-member 46 and extend upwardly through slots 50 in the mounting plate 43 respectively. The ends of lugs 43 form pivot-seats 51 for the ends respectively of a pair of oppositely arched resilient trusses 52. These trusses are arched laterally and held unlocked with the lugs 49 by ribs 53 on the upper ends of the pivot-seats 51. The slots 50 permit the lugs 49 to slide in the mounting plate when the resilient plate 38 is flattened by the shock stresses. An arch 54, integral with the mounting plate 43, extends over the trusses 52. These trusses have hooks 52$^a$ at their ends which are looped around the pivot-seats 51 respectively. When the structure is subjected to shock, the resilient plate 48 will flatten and the abutment members 46 will slide apart on the underside of the mounting plate 43. The flattening of the resilient plate will be resisted by both of the trusses 52. As the abutment members are spread the trusses will flatten laterally and resist the flattening of the resilient plate 48.

In practice, the resilient bowed plate is usually made of vanadium steel and the trusses are formed of carbon or vanadium steel, depending upon the capacity desired in the shock absorber. The resistance of the bowed plate to render the absorber suitable for different loads, may be attained by varying the flexibility of the trusses, either by varying their cross sectional area or by varying the radius of curve in arch of the trusses. This makes it possible to change the capacity of the shock-absorber without changing the resilient bowed plate.

In practice, the trusses are made with greater resistance to bending than that of the resilient plate, usually about three times as great. By reason of these differential resistances, no harmonic vibration is ever set up in the shock absorber, such as that which frequently occurs in the use of elliptic cushion springs.

The invention lends itself to many applications where there is very little space between the elements, such as between the journal box and equalizer bar of a railway truck or between the bolster spring-plate and the truck-frame of a freight car or between a car-body and the truck bolster. In all of the exemplifications of the invention illustrated, the ends of the resilient plate are supported on a suitable base or support, and the trusses act to resist the spreading of the plate, and are supported by the base or support, but are not interposed between the resilient plate and either of the elements between which the shock absorber is applied.

The trusses make it possible to provide a shock absorber of great capacity which is usable where very little space is available for cushioning the elements between which the shock absorber is applied.

This application is a continuation in part of Serial No. 465,678 filed by me July 3, 1930.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a pair of relatively movable elements of a shock absorber between said elements and comprising a resilient bowed plate, slidably connected members having abutments for the ends of the plate respectively, and resilient means for pressing the abutments towards the ends of the plate and applied to the abutments to yieldingly resist the spreading of the abutments when the plate is flattened one of said elements being provided with means for exerting pressure against the central portion of the plate to flatten the plate and spread the slidably connected members.

2. The combination with a pair of relatively movable elements of a shock absorber between said elements and comprising a resilient bowed plate, slidably connected rigid members having abutments for the ends of the plate respectively, and resilient means for retaining the abutments against the ends of the plate and applied to the abutments to yieldingly resist the spreading of the abutments when the plate is flattened one of said elements being provided with means for exerting pressure against the central portion of the plate to flatten the plate and spread the slidably connected members.

3. The combination with a pair of relatively movable elements of a shock absorber between said elements and comprising a resilient bowed plate, slidably connected rigid members having abutments against which the ends of the plate are seated respectively, and a pair of arched resilient members disposed at the sides of and connecting the slidably connected members to retain them against the ends of the plate and applied to the abutments to resist flattening of the plate one of said elements being provided with means for exerting pressure against the central portion of the plate to flatten the plate and spread the slidably connected members.

4. The combination with a pair of relatively movable elements of a shock absorber between said elements and comprising a resilient bowed plate, slidably connected abutments for the ends of the plate respectively, and a resilient truss between the abutments, for pressing them toward the ends of the plate and applied to the abutments to resist the flattening of the plate one of said elements being provided with means for exerting pressure against the central portion of the plate to flatten the plate and spread the slidably connected members.

5. The combination with a pair of relatively movable elements of a shock absorber between said elements and comprising a resilient bowed plate, slidably connected rigid members having abutments for the ends of the plate respectively, and a resilient truss engaging the members and connected thereto so as to resist the spread of the abutments by the plate one of said elements being provided with means for exerting pressure against the central portion of the plate to flatten the plate and spread the slidably connected members.

6. The combination with a pair of relatively movable elements of a shock absorber between said elements and comprising a resilient bowed plate, slidably connected rigid abutments for the ends of the plate, respectively, and a pair of resilient trusses engaging the abutments and resisting the spread of the abutments by the plate, said trusses being disposed at the sides of the slidably connected members one of said elements being provided with means for exerting pressure against the central portion of the plate to flatten the plate and spread the slidably connected members.

7. A shock absorber, comprising a rigid base provided with means whereby it may be connected to one of the elements between which the shock absorber is used, and with an abutment, a resilient bowed plate having one of its ends against the abutment on the base, an abutment slidably connected to the base and against the other end of the plate, and resilient means for pressing the abutments against the ends of the plate respectively.

8. A shock absorber comprising a rigid base provided with means whereby it may be secured to one of the elements between which the shock absorber is used and with an abutment, a resilient bowed plate having one of its ends against the abutment on the base, an abutment slidably connected to the base and against the other end of the plate, and a resilient truss for retaining the abutments against the ends of the plate respectively and resisting the spread of the abutments by the plate.

9. A shock absorber comprising a rigid base provided with means whereby it may be secured to one of the elements between which the shock absorber is used and with an abutment, a resilient bowed plate having one of its ends pressed against the abutment on the base, an abutment slidably mounted on the base and engaged by the other end of the plate, and a pair of resilient trusses at the sides of the base for retaining them in engagement with the ends of the plate respectively, and resisting the spread of the abutments by the plate.

10. A shock absorber comprising a base, a pair of abutments slidably mounted on the base, a resilient bowed plate, having its ends pressed against the abutments respectively, and resilient means for pressing the abutments against the ends of the arched plate and resisting the spreading of the abutments by the flattening of the plate.

11. A shock absorber comprising a base, a pair of abutments slidably mounted on the base, a resilient bowed plate, having its ends against the abutments respectively, and a resilient truss for retaining the abutments and the ends of the arched plate together, and resisting the spread of the abutments when the plate is flattened.

12. A shock absorber comprising a rigid base, a pair of rigid abutments slidably mounted on the base, a resilient bowed plate having its ends engaging the abutments respectively, and a pair of resilient trusses for retaining the abutments against the ends of the arched plate and to resist spreading thereof by the plate.

13. A shock absorber comprising a resilient bowed plate, slidably connected rigid members having abutments for the ends of the plate respectively, means for connecting one of the slidably connected members to one of the elements between which the shock absorber is used, and an integral projection on the arched plate to interfit with and connect the plate to the other element.

14. A shock absorber comprising a resilient bowed plate, slidably connected rigid members having abutments against which the ends of the plate are seated respectively, means for connecting one of the slidably connected members to one of the elements between which the shock absorber is used, and an integral projection on the crest of the arched plate to interfit with and connect the plate to the other element.

15. A shock absorber comprising a resilient bowed plate, slidably connected members having abutments against which the ends of the plate are seated respectively, resilient means for retaining the abutments in engagement with the ends of the arched plate, and a stop on one of the members to limit the flattening of the arched plate.

16. A shock absorber comprising a resilient bowed plate, slidably connected members having abutments against which the ends of the plate are seated respectively, resilient means for retaining the abutments in engagement with the ends of the arched plate, and stop-means on one of the members to arrest the arched plate before it becomes flat.

17. The combination with two relatively movable elements, of a shock absorber between said elements, comprising a resilient bowed plate having its crest engaging one of the elements, a rigid body on and movable with the other element for supporting the ends of the plate so they can spread, and means carried by the body for yieldingly resisting the flattening of the plate.

18. The combination with two relatively movable elements, of a shock absorber between said elements, comprising a resilient bowed plate having its crest engaging one of the elements, a rigid mount on and movable with the other element, for supporting the ends of the plate so they can spread, and means carried by the mount for yieldingly resisting the flattening of the plate, also carried on said mount.

19. A shock absorber comprising a resilient bowed plate, means for supporting the plate so its ends can be spread when the plate is flexed, and a resilient truss for yieldingly resisting the flattening of the plate, having substantially greater resistance to bending than the plate.

20. A shock absorber comprising a resilient bowed plate, means for supporting the plate so its ends can be spread when the plate is flexed, and a pair of resilient trusses for yieldingly resisting the flattening of the plate having substantially greater resistance to bending than the plate.

WILLIAM C. DREWS.